July 8, 1969  L. O. CHUA  3,454,908
LINEAR ACTIVE NETWORK THAT ROTATES A NONLINEAR RESISTOR
CHARACTERISTIC THROUGH A PREDETERMINED ANGLE
Filed Feb. 23, 1967  Sheet _1_ of 3

INVENTOR
LEON O. CHUA
BY John R. Nesbitt
ATTORNEY

INVENTOR.
LEON O. CHUA
BY John R. Nesbitt
ATTORNEY

INVENTOR.
LEON O. CHUA
BY John R. Nesbitt
ATTORNEY

United States Patent Office 3,454,908
Patented July 8, 1969

3,454,908
LINEAR ACTIVE NETWORK THAT ROTATES A NONLINEAR RESISTOR CHARACTERISTIC THROUGH A PREDETERMINED ANGLE
Leon O. Chua, West Lafayette, Ind., assignor to Purdue Research Foundation
Filed Feb. 23, 1967, Ser. No. 618,037
Int. Cl. H01p 1/24
U.S. Cl. 333—80                                7 Claims

ABSTRACT OF THE DISCLOSURE

A device used for synthesizing purposes and having basically a pi or T configuration including either one or two elements exhibiting negative characteristics. Rotation of a nonlinear characteristic can be clockwise or counter-clockwise with only one negative element being required in a pi-configuration when rotation occurs between 0° and 180° in the counter-clockwise direction or in a T-configuration when rotation occurs between —180° and 0° in the clockwise direction. A balanced configuration is also included.

---

This invention relates to a linear active network device and more particularly to a device for rotating a predetermined characteristic for synthesizing purposes.

A two terminal nonlinear device, such as a resistor, inductor or capacitor, can be characterized by a curve, such as, for example, a voltage-current curve for a resistor, a flux-linkage-current curve for an inductor, and a charge-voltage curve for a capacitor.

It is a feature of this invention to synthesize new devices which are related to the original nonlinear device by changing these respective characteristic curves, particularly by rotation. This not only makes available a new generation of practical devices with useful practical applications, but also optimizes the characteristics of known devices, including transistors and vacuum tubes, to thus at least improve the associated circuitry.

It is therefore an object of this invention to provide a heretofore unknown device for rotating characteristics of nonlinear devices for synthesizing purposes.

It is another object of this invention to provide a heretofore unknown device utilizing a plurality of linear elements at least one of which exhibits negative resistance characteristics for rotation of a predetermined characteristic of a nonlinear device.

It is still another object of this invention to provide a heretofore unknown device which rotates a predetermined characteristic of a nonlinear device to synthesize a linear active network.

Still another object is to synthesize novel devices with multivalued characteristics.

Yet another object is to provide a device that can be used to design instruments for displaying multivalued $i$–$v$ curves on an oscilloscope.

Another object is to provide a device to synthesize a set of basic components required in the synthesis of new devices.

Yet another object is to provide a device that is useful in the design of multi-state devices such as multi-vibrators.

Referring to the drawings, in which.

The principle of operation of this invention is based on the concept of rotation of coordinates in analytic geometry. It is well known that any curve in the X–Y plane can be rotated by $\theta$ degrees by a transformation of the coordinates, namely:

$$X' = \cos \theta X - \sin \theta Y \qquad (1)$$
$$Y' = \sin \theta X + \cos \theta Y \qquad (2)$$

For the embodiment of this invention utilizing resistive linear elements, which can be called an "R-Rotator," X becomes the voltage V and Y becomes the current I (since the characteristic of the nonlinear resistors to be rotated is the voltage-current characteristic) so that:

$$V' = \cos \theta V - \sin \theta I \qquad (3)$$
$$I' = \sin \theta V + \cos \theta I \qquad (4)$$

Hence, it can readily appreciated that the characteristic can be rotated through any number of degrees in either direction by proper selection of configuration.

Figure 1:
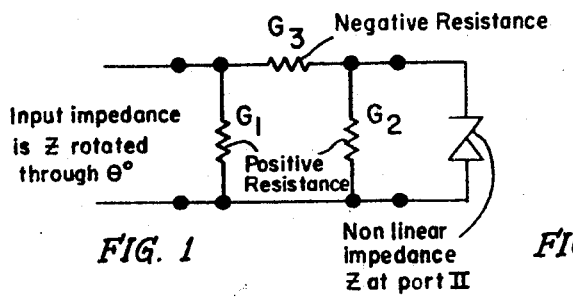
FIGURE 1 is a pi-configuration of this invention utilizing resistors.

Referring now to the drawings, FIGURE 1 shows a pi-configuration utilizing resistors. In this configuration, $$G_1 = G_2 = \tan \theta/2 \text{ mho} \qquad (5)$$
$$G_3 = -\csc \theta \text{ mho} \qquad (6)$$

where G is conductance and $\theta$ is the number of degrees of rotation.

Utilizing this pi-configuration, counter-clockwise rotation between $0° < \theta < 180°$ is possible with only one negative element. Such a negative element, a negative resistor in this case, can be conventional and can, for example, be a negative impedance converter or an ordinary operational amplifier, or the negative resistance could be realized with devices with inherent negative resistance or an interconnection of active devices which exhibit negative resistance characteristics across certain terminal pairs.

Figure 12:
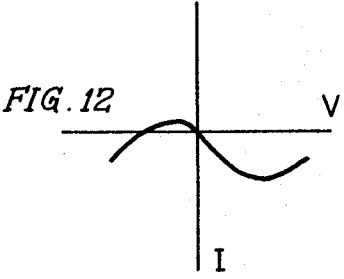
Figure 13:
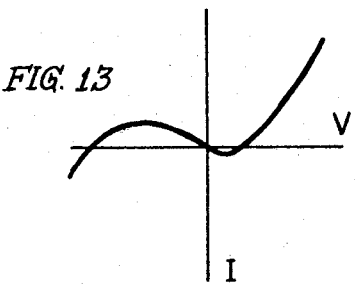
Figure 14:
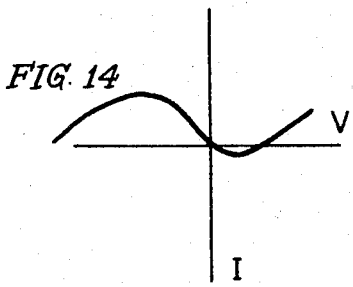
Figure 15:
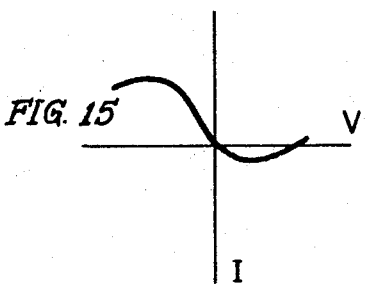
Figure 16:
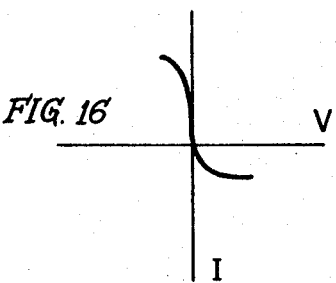
Figure 17:
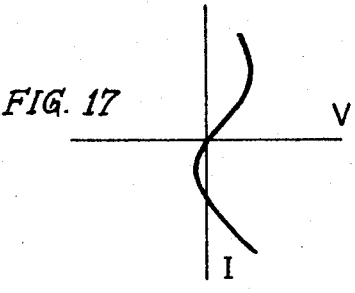
Figure 18:
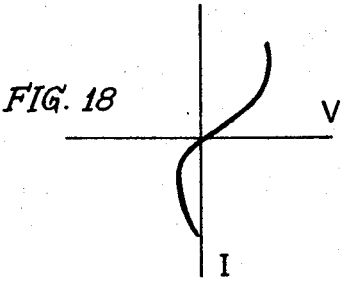

FIGURES 7 through 12 illustrate, by means of current-voltage (I–V) curves, how a typical nonlinear resistor device can be rotated from 0° (FIGURE 7) in a counter-clockwise direction through 30° (FIGURE 8), 45° (FIGURE 9), 60° (FIGURE 10), 90° (FIGURE 11), and 135° (FIGURE 12). In like manner, FIGURES 13 through 18 illustrate rotation in a clockwise direction through —30° (FIGURE 13), —45° (FIGURE 14), —60° (FIGURE 15), —90° (FIGURE 16), —135° (FIGURE 17), and —150° (FIGURE 18).

It has been found that an "R Rotator" of this type was stable and quite insensitive to element parameter changes.

In practice, all element values must be multiplied by a scale factor determined by the scale of the curve to be rotated, for example, to rotate an I–V curve in the ma.-volt plane (shown in FIGURES 7–18), the values of the resistors must be multiplied by $10^3$.

Figure 2:
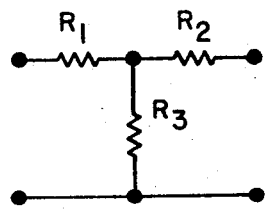
FIGURE 2 is a T-configuration of this invention utilizing resistors.

FIGURE 2 shows a T-configuration of the invention utilizing resistors, and in which:

$$R_1 = R_2 = -\tan \theta/2 \text{ ohm} \qquad (7)$$
$$R_3 = \csc \theta \text{ ohm} \qquad (8)$$

With this configuration, it has been found that only one negative resistor is needed when rotation is clockwise and $-180° < \theta < 0°$.

The "R-Rotator" also has: an open circuit impedance matrix:

$$\underset{\sim}{Z}_{(p)} = \begin{bmatrix} \cot\theta & \csc\theta \\ \csc\theta & \cot\theta \end{bmatrix} \quad (9)$$

a short circuit admittance matrix:

$$\underset{\sim}{Y}_{(p)} = \begin{bmatrix} -\cot\theta & \csc\theta \\ \csc\theta & -\cot\theta \end{bmatrix} \quad (10)$$

a transmission (chain) matrix:

$$\underset{\sim}{T}_{(p)} = \begin{bmatrix} \cos\theta & -\sin\theta \\ \sin\theta & \cos\theta \end{bmatrix} \quad (11)$$

and a scattering matrix (normalized to unit port numbers):

$$\underset{\sim}{S}_{(p)} = \begin{bmatrix} -\tan\theta & \sec\theta \\ \sec\theta & -\tan\theta \end{bmatrix} \quad (12)$$

Figure 3:
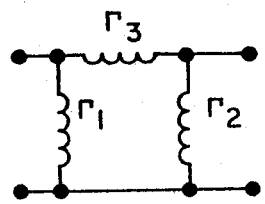
FIGURE 3 is a pi-configuration of this invention utilizing inductors.

FIGURE 3 shows a pi-configuration utilizing inductors as the linear elements and these elements are given as follows:

$$\sqrt{1} = \sqrt{2} = \tan\theta/2 \text{ (henry)}^{-1} \quad (13)$$

$$\sqrt{3} = -\csc\theta \text{ (henry)}^{-1} \quad (14)$$

This configuration is similar in operation to that of the configuration shown in FIGURE 1 and, in like manner, clockwise rotation with a range of $\theta$ of $0° < \theta < 180°$ requires only one negative element.

Figure 4:
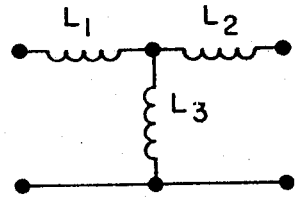
FIGURE 4 is a T-configuration of this invention utilizing inductors.

FIGURE 4 shows a T-configuration utilizing inductors as the linear elements and these elements are given as follows:

$$L_1 = L_2 = -\tan\theta/2 \text{ (henry)} \quad (15)$$

$$L_3 = \csc\theta \text{ (henry)} \quad (16)$$

This configuration is similar in operation to that of the configuration shown in FIGURE 2 and, in like manner, counter-clockwise rotation with a range of $\theta$ of $$-180° < \theta < 0°$$

requires only one negative element.

Like the "R-Rotator," the rotator utilizing inductors ("L-Rotator") has the following— an open circuit impedance matrix:

$$\underset{\sim}{Z}_{(p)} = \begin{bmatrix} p(\cot\theta) & p(\csc\theta) \\ p(\csc\theta) & p(\cot\theta) \end{bmatrix} \quad (17)$$

a short circuit admittance matrix:

$$\underset{\sim}{Y}_{(p)} = \begin{bmatrix} -\dfrac{(\cot\theta)}{p} & \dfrac{(\csc\theta)}{p} \\ \dfrac{(\csc\theta)}{p} & \dfrac{(\cot\theta)}{p} \end{bmatrix} \quad (18)$$

a transmission (chain) matrix:

$$\underset{\sim}{T}_{(p)} = \begin{bmatrix} \cos\theta & -p(\sin\theta) \\ \dfrac{\sin\theta}{p} & \cos\theta \end{bmatrix} \quad (19)$$

and a scattering matrix (normalized to unit port numbers):

$$\underset{\sim}{S}_{(p)} = \begin{bmatrix} \dfrac{(p^2+1)}{(p^2-2p\cot\theta-1)} & \dfrac{-2p\csc\theta}{(p^2-2p\cot\theta-1)} \\ \dfrac{-2p\csc\theta}{(p^2-2p\cot\theta-1)} & \dfrac{(p^2+1)}{(p^2-2p\cot\theta-1)} \end{bmatrix} \quad (20)$$

Figure 5:
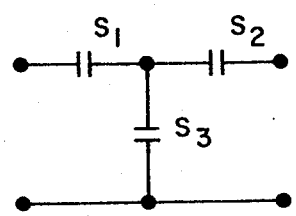
FIGURE 5 is a pi-configuration of this invention utilizing capacitors.

FIGURE 5 shows a T-configuration utilizing capacitors as the linear elements and these elements are given as follows:

$$C_1 = S_2 = \tan\theta/2 \text{ (farad)}^{-1} \quad (21)$$

$$S_3 = -\csc\theta \text{ (farad)}^{-1} \quad (22)$$

This configuration is similar in operation to that of the configuration shown in FIGURE 1 and, in like manner, clockwise rotation with a range of $\theta$ of $0° < \theta < 180°$ requires only one negative element.

Figure 6:
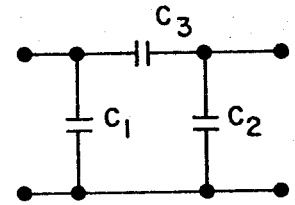
FIGURE 6 is a T-configuration of this invention utilizing capacitors.

FIGURE 6 shows a pi-configuration utilizing capacitors as the linear elements and these elements are given as follows:

$$C_1 = C_2 = -\tan\theta/2 \text{ (farad)} \quad (23)$$

$$C_3 = \csc\theta \text{ (farad)} \quad (24)$$

This configuration is similar in operation to that of the configuration shown in FIGURE 2 and, in like manner, counter-clockwise rotation with a range of $\theta$ of $-180° < \theta < 0°$ requires only one negative element.

Like the "R-Rotator," the rotator utilizing capacitors ("C-Rotator") has the following— an open circuit impedance matrix:

$$\underset{\sim}{Z}_{(p)} = \begin{bmatrix} -\dfrac{(\cot\theta)}{p} & -\dfrac{(\csc\theta)}{p} \\ -\dfrac{(\csc\theta)}{p} & -\dfrac{(\cot\theta)}{p} \end{bmatrix} \quad (25)$$

a short circuit admittance matrix:

$$\underset{\sim}{Y}_{(p)} = \begin{bmatrix} p(\cot\theta) & -p(\csc\theta) \\ -p(\csc\theta) & p(\cot\theta) \end{bmatrix} \quad (26)$$

a transmission (chain) matrix:

$$\underset{\sim}{T}_{(p)} = \begin{bmatrix} \cos\theta & \dfrac{(\sin\theta)}{p} \\ -p(\sin\theta) & \cos\theta \end{bmatrix} \quad (27)$$

and a scattering matrix (normalized to unit port numbers):

$$\underset{\sim}{S}_{(p)} = \begin{bmatrix} \dfrac{-(p^2+1)}{(p^2-2p\cot\theta-1)} & \dfrac{-2p\csc\theta}{(p^2-2p\cot\theta-1)} \\ \dfrac{-2p\csc\theta}{(p^2-2p\cot\theta-1)} & \dfrac{-(p^2+1)}{(p^2-2p\cot\theta-1)} \end{bmatrix} \quad (28)$$

Figure 19:
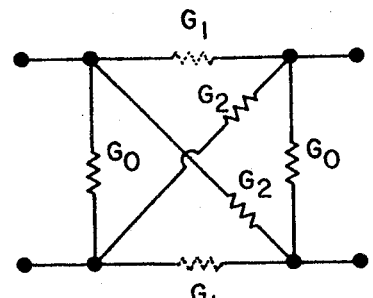
FIGURE 19 is a balanced configuration of this invention utilizing resistors.
Figure 7:
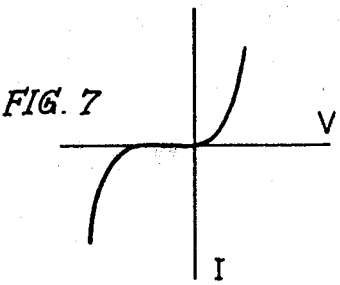
FIGURES 7 through 18 are typical wave forms such as would appear on an oscilloscope to illustrate rotation of a typical nonlinear resistor device by various angles of rotation both in the clockwise and counter-clockwise direction.
Figure 8:
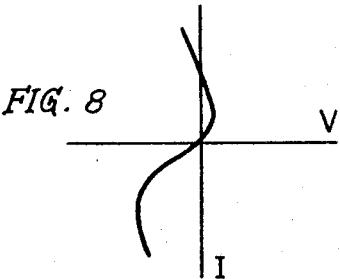
Figure 9:
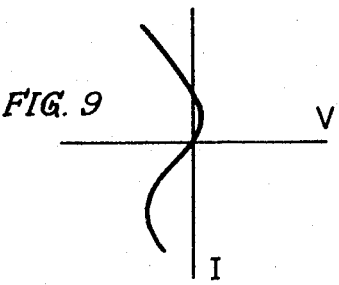
Figure 10:
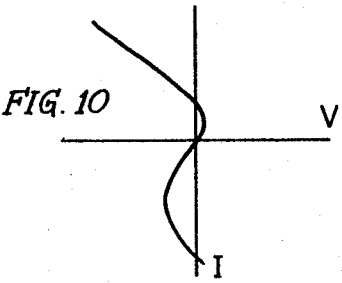
Figure 11:
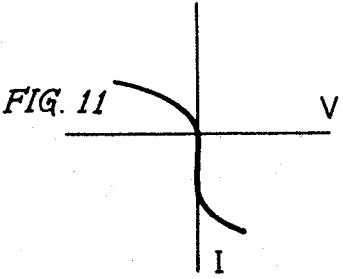

FIGURE 19 shows a balanced configuration that always requires two negative elements regardless of the direction of rotation. The elements of this configuration are as follows:

$$G_0 = -\cot\theta - |\csc\theta| \quad (29)$$

$$G_1 = |\csc\theta| - \csc\theta \quad (30)$$

$$G_2 = |\csc\theta| + \csc\theta \quad (31)$$

The rotators described hereinabove have been successfully realized by lumped network elements, but may also be realized by distributed network elements in the form of integrated circuits.

The invention described herein can be utilized to synthesize an unlimited number of new devices from existing devices, as well as optimizing some devices parameters, such as gain, input impedance, output impedance, etc., and thus makes it possible to synthesize devices with characteristics heretofore never known. In addition, since the rotator is not very sensitive to element parameter value change, it can be utilized as a linear active network element for synthesizing linear active filters and networks. Also, when a linear impedance or admittance is connected to one port of the "R-Rotator," the impedance or admittance across the other port of the rotator is a bilinear transformation of the original impedance or admittance. Finally, the rotator can also be utilized to synthesize highly accurate linear resistors, inductors, or capacitors of unusually large or unusually small element parameters.

I claim:

1. A linear active network device, comprising: first, second and third linear resistors connected in pi-configuration to form a 2 port network, at least one of which resistors is a negative resistor, wherein said linear resistors are connected to one another by the negative resistor and wherein said first and second linear resistors are equal to tan $\theta/2$ mho and said third resistor is equal to $-\csc \theta$ mho, whereby a predetermined nonlinear resistor characteristic connected to one port is rotated through the angle $\theta$, as seen at the other port, and $\theta$ is selected, as desired, between the values 0° and 360°.

2. A linear active network device, comprising: first, second and third linear resistors connected in T-configuration to form a 2 port network, at least one of which resistors is a negative resistor, wherein said linear resitsors are connected at the junction by a negative resistor, and wherein said first linear resistor is equal to $\csc \theta$ ohm and said second and third linear resistors are equal to $-\tan \theta/2$ ohm, whereby a predetermined nonlinear resistor characteristic connected to one port is rotated through the angle $\theta$, as seen at the other port, and $\theta$ is selected, as desired, between the values 0° and 360°.

3. A linear active network device, comprising: first, second and third linear inductors connected in pi-configuration to form a 2 port network, at least one of which inductors is a negative inductor, wherein said linear inductors are connected to one another by a negative inductor and wherein said first and second linear inductors are equal to tan $\theta/2$(henry)$^{-1}$, and said negative inductor is equal to $-\csc \theta$ (henry)$^{-1}$, whereby a predetermined nonlinear inductor characteristic connected to one port is rotated through the angle $\theta$, as seen at the other port, and $\theta$ is selected, as desired, between the values 0 ° and 360°.

4. A linear active network device, comprising: first, second and third linear inductors connected in T-configuration to form a 2 port network, at least one of which inductors is a negative inductor, wherein said linear inductors are connected at the junction by a negative inductor, and wherein said first inductor is equal to $\csc \theta$ (henry), and said second and third linear inductors are equal to $-\tan \theta/2$ (henry), whereby a predetermined nonlinear inductor characteristic connected to one port is rotated through the angle $\theta$, as seen at the other port, and $\theta$ is selected, as desired, between the values 0° and 360°.

5. A linear active network device, comprising: first, second and third linear capacitors connected in T-configuration to form a 2 port network, at least one of which capacitors is a negative capacitor, wherein said linear capacitors are connected at the junction by a negative capacitor and wherein said first and second capacitors are equal to tan $\theta/2$ (farad)$^{-1}$ and said third capacitor is equal to $-\csc \theta$ (farad)$^{-1}$, whereby a predetermined nonlinear capacitor characteristic connected to one port is rotated through the angle $\theta$, as seen at the other port, and $\theta$ is selected, as desired, between the values 0° and 360°.

6. A linear active network device, comprising: first, second and third linear capacitors connected in pi-configuration to form a 2 port network at least one of which capacitors is a negative capacitor, wherein said linear capacitors are connected to one another by a negative capacitor, and wherein said first capacitor is equal to $\csc \theta$ (farad) and said second and third capacitors are equal to $-\tan \theta/2$ (farad), whereby a predetermined nonlinear capacitor characteristic connected to one port is rotated through the angle $\theta$, as seen at the other port, and $\theta$ is selected, as desired, between the values 0° and 360°.

7. A balanced linear active network device, comprising: a first plurality of resistors, a second plurality of resistors exhibiting negative characteristics, and means for connecting said resistors in a balanced configuration and wherein said first plurality includes at least two resistors and wherein said second plurality includes at least two negative resistors and wherein said negative resistors are connected to opposite sides of each of said two resistors and two of said four resistors are equal to $|\csc \theta| \pm \csc \theta$, and wherein the two negative devices are equal to $-\cot \theta - |\csc \theta|$, where $\theta$ is the angle rotated.

References Cited

UNITED STATES PATENTS

| | | | |
|---|---|---|---|
| 2,237,782 | 4/1941 | Holzler | 333—80 X |
| 2,373,624 | 4/1945 | Zinn | 333—80 X |
| 3,046,504 | 7/1962 | Sandberg | 333—80 |

HERMANN KARL SAALBACH, *Primary Examiner.*

P. L. GENSLER, *Assistant Examiner.*

U.S. Cl. X.R.

307—322